United States Patent
Kuenzner

(10) Patent No.: US 11,897,561 B2
(45) Date of Patent: Feb. 13, 2024

(54) DRIVING SYSTEM WITH AUTOMATED LATERAL GUIDANCE WHICH CAN BE DEACTIVATED BY A STEERING INTERVENTION, AND METHOD FOR DEACTIVATING AUTOMATED LATERAL GUIDANCE

(71) Applicant: Bayerische Motoren Werke Aktiengesellschaft, Munich (DE)

(72) Inventor: Hermann Kuenzner, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/256,100

(22) PCT Filed: Jun. 24, 2019

(86) PCT No.: PCT/DE2019/100577
§ 371 (c)(1),
(2) Date: Dec. 24, 2020

(87) PCT Pub. No.: WO2020/001697
PCT Pub. Date: Jan. 2, 2020

(65) Prior Publication Data
US 2021/0269089 A1 Sep. 2, 2021

(30) Foreign Application Priority Data
Jun. 25, 2018 (DE) ............ 10 2018 210 320.8

(51) Int. Cl.
*B62D 6/08* (2006.01)
*B62D 15/02* (2006.01)

(52) U.S. Cl.
CPC ............ *B62D 6/08* (2013.01); *B62D 15/025* (2013.01); *B62D 15/0285* (2013.01)

(58) Field of Classification Search
CPC .... B62D 6/08; B62D 15/025; B62D 15/0285; B62D 1/286
(Continued)

(56) References Cited

U.S. PATENT DOCUMENTS

| 7,019,623 B2 | 3/2006 | Klausner et al. |
| 2003/0014162 A1 | 1/2003 | Sadano |

(Continued)

FOREIGN PATENT DOCUMENTS

| CN | 102529966 A | 7/2012 |
| CN | 105263736 A | 1/2016 |

(Continued)

OTHER PUBLICATIONS

DE-102016217772-A1 English Translation—Aug. 2016.*
(Continued)

*Primary Examiner* — Scott A Reinbold
(74) *Attorney, Agent, or Firm* — Crowell & Moring LLP

(57) ABSTRACT

A driving system for automated driving includes at least automated lateral guidance for a motor vehicle. The system is configured to determine whether one or more indications of a current or imminent manual steering intervention are present, which do not take place inadvertently and are intentional by a driver. Starting from a driving state with activated automated lateral guidance, the driving system deactivates the automated lateral guidance in response to the manual steering intervention. To deactivate the lateral guidance, a necessary steering torque operating counter to the activated lateral guidance is applied by the driver via the steering wheel within the scope of the manual steering intervention. When the at least one indication of the steering intervention intended by the driver is found to be present, the
(Continued)

steering torque necessary to deactivate the lateral guidance is lower than when the indication of an intended steering intervention is not present.

20 Claims, 4 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 2003/0189493 | A1* | 10/2003 | Klausner | B62D 1/06 340/575 |
| 2012/0166032 | A1 | 6/2012 | Lee et al. | |
| 2012/0326735 | A1* | 12/2012 | Bennett | B62D 1/06 324/705 |
| 2016/0121886 | A1* | 5/2016 | Eigel | B60W 30/12 701/23 |
| 2017/0183025 | A1* | 6/2017 | Okazaki | B62D 1/06 |
| 2018/0370542 | A1 | 12/2018 | Braunagel et al. | |
| 2019/0009791 | A1 | 1/2019 | Hergeth | |
| 2019/0193788 | A1* | 6/2019 | Augst | B60K 28/06 |

FOREIGN PATENT DOCUMENTS

| | | | | |
|---|---|---|---|---|
| DE | 10 2009 022 055 A1 | | 11/2010 | |
| DE | 102009022055 A1 * | | 11/2010 | B60W 50/085 |
| DE | 10 2009 050 404 A1 | | 5/2011 | |
| DE | 10 2013 010 928 A1 | | 12/2014 | |
| DE | 10 2014 208 785 A1 | | 11/2015 | |
| DE | 102016217772 A1 * | | 3/2018 | B60K 28/06 |
| EP | 2 314 489 A1 | | 4/2011 | |
| EP | 2 253 499 B1 | | 7/2012 | |
| EP | 2 314 489 B1 | | 8/2015 | |
| JP | 2005-70982 A | | 3/2005 | |
| WO | WO 01/94188 A1 | | 12/2001 | |
| WO | WO 2017/102057 A1 | | 6/2017 | |
| WO | WO 2017/157588 A1 | | 9/2017 | |
| WO | WO 2018/050377 A1 | | 3/2018 | |

OTHER PUBLICATIONS

International Search Report (PCT/ISA/210) issued in PCT Application No. PCT/DE2019/100577 dated Sep. 25, 2019 with English translation (seven (7) pages).

German-language Written Opinion (PCT/ISA/237) issued in PCT Application No. PCT/DE2019/100577 dated Sep. 25, 2019 (seven (7) pages).

German-language Search Report issued in German Application No. 10 2018 210 320.8 dated Jan. 18, 2019 with partial English translation (13 pages).

Bundesanstalt fuer Strassenwesen: Forschung kompakt. "Rechtsfolgen zunehmender Fahrzeugautomatisierung", Bergisch Gladbach, (BASt—German Federal Highway Research Institute), 2012 (Nov. 2012) 1-2—Fimenschrift (32 pages).

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

Chinese-language Office Action issued in Chinese Application No. 201980031746.X dated Jul. 5, 2022 with English translation (22 pages).

* cited by examiner

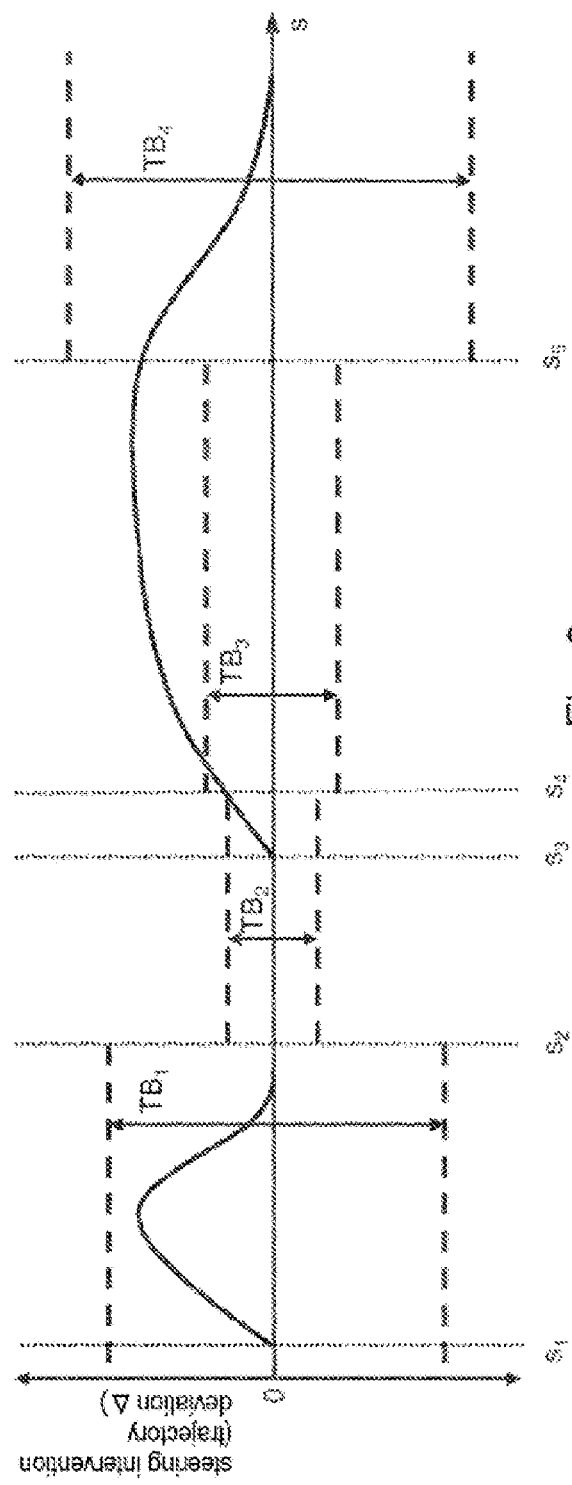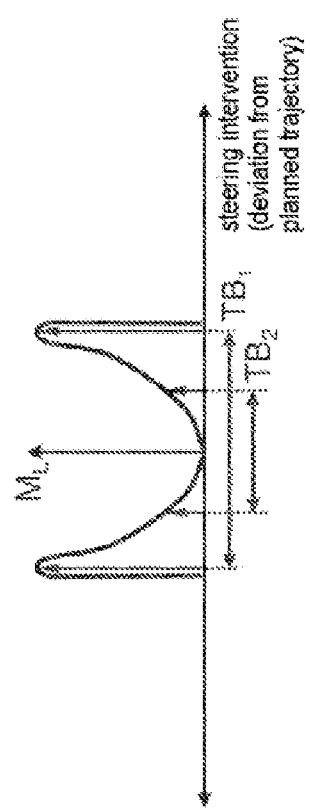

DRIVING SYSTEM WITH AUTOMATED LATERAL GUIDANCE WHICH CAN BE DEACTIVATED BY A STEERING INTERVENTION, AND METHOD FOR DEACTIVATING AUTOMATED LATERAL GUIDANCE

BACKGROUND AND SUMMARY OF THE INVENTION

The present subject matter relates to a driving system with at least automated lateral guidance in which the driving system can be deactivated via a driver-side steering intervention, and to a method for deactivating automated lateral guidance via a steering intervention.

As used herein, the term "automated driving" can be understood to mean driving with automated longitudinal or lateral guidance or autonomous driving with automated longitudinal and lateral guidance. The automated driving can be, for example, driving on the highway for a relatively long time. It would also be conceivable, however, that this is a temporally restricted driving maneuver, for example, within the context of automated parking or moving off or maneuvering. The term "automated driving" comprises automated driving with any desired degree of automation. Example degrees of automation are assisted, partially automated, highly automated or fully automated driving. The stated degrees of automation have been defined by the Bundesanstalt für Straßenwesen (BASt—German Federal Highway Research Institute) (see BASt publication "Forschung kompakt" [Research News], November 2012 edition). In the case of assisted driving, the driver uninterruptedly carries out the longitudinal or lateral guidance, whereas the system assumes the respective other function within certain limits. In the case of partially automated driving (TAF), the system assumes the longitudinal and lateral guidance for a certain time period and/or in specific situations, it being necessary for the driver to monitor the system uninterruptedly as in the case of assisted driving. In the case of highly automated driving (HAF), the system assumes the longitudinal and lateral guidance for a certain time period, without it being necessary for the driver to monitor the system uninterruptedly; the driver has to be capable, however, within a certain time of assuming control of the driving vehicle. In the case of fully automated driving (VAF), the system can manage the driving in all situations automatically for a specific application; a driver is no longer required for said application. The abovementioned four degrees of automation correspond to SAE Levels 1 to 4 of the SAE (Society of Automotive Engineering) J3016 standard. For example, the highly automated driving (HAF) corresponds to Level 3 of the SAE J3016 standard. Furthermore, SAE Level 5 is provided in SAE J3016 as the highest degree of automation which is not contained in the definition of the BASt. SAE Level 5 corresponds to driverless driving, in the case of which the system can manage all situations during the entire journey automatically like a human driver; a driver is generally no longer required.

Driving systems with automated longitudinal and lateral guidance frequently provide the driver the possibility to switch off the automated lateral guidance and to drive only with automated longitudinal guidance. A deactivation of the lateral guidance is appropriate, for example, in situations when said lateral guidance does not operate satisfactorily. This is possible, for example, in highway road works when the roadway and/or lane course is not detected correctly by the driving system in some circumstances because of glued temporary lane markings, tar verges, etc., and the lateral guidance does not operate as desired as a result.

From a comfort aspect, it is not optimum in situations of this type for the lateral guidance to be switched off by way of an operating button, or even in a menu, and to be switched on again after the situation has been resolved. Because of the manual switch-off, the driver is even distracted from the driving process in some circumstances.

The automated lateral guidance can normally be overridden by way of a manual steering intervention via the steering wheel. Most drivers will intuitively override the automated lateral guidance by way of a manual steering intervention if the vehicle, for example, follows an unexpected trajectory.

The automated lateral guidance can normally also be deactivated by way of a manual steering intervention. It is conceivable that a manual steering intervention has taken place inadvertently. Therefore, the driving system is designed in such a way that the driver has to apply a steering torque with a sufficiently great magnitude (which operates counter to the activated lateral guidance) within the context of the manual steering intervention in order to deactivate the lateral guidance. This prevents a situation where even a slight contact, for example, by way of the arm, deactivates the automated lateral guidance. In the case of a deliberate steering intervention, however, it is laborious for the driver to apply said necessary steering torque which operates counter to the automated lateral guidance, in order to deactivate the automated lateral guidance.

It is an object of the present subject matter to specify a driving system with a simpler deactivation of the automated lateral guidance for the driver, and a corresponding method for deactivating automated lateral guidance.

A first aspect of the present subject matter relates to a driving system for automated driving with at least automated lateral guidance for a motor vehicle (in particular, a passenger motor car) with a steering wheel. The driver system is, for example, a driving system with automated longitudinal and lateral guidance in accordance with SAE Level 3.

The driving system is set up to carry out various activities which are described in the following text. This preferably takes place by means of an electronic control unit which is situated on a control appliance or can be distributed among a plurality of control appliances. The electronic control unit can comprise one or more processors which operate in a way according to the present subject matter such that they are controlled for one or a plurality of software programs.

The driving system is set up to determine that there are one or more indications that a current or imminent manual steering intervention does not take place inadvertently, but rather is intended by the driver.

Starting from a driving state with activated automated lateral guidance, the driving system can deactivate the automated lateral guidance as a reaction to a manual steering intervention, wherein a necessary steering torque which operates counter to the activated lateral guidance is to be applied by the driver via the steering wheel within the context of the manual steering intervention in order to deactivate the lateral guidance.

The deactivation can take place, for example, abruptly depending on the method of implementation or can take place gradually, wherein, in the second case, the influence of the manual lateral guidance is decreased in a temporally successive manner.

The driving system configures the magnitude of the steering torque which is necessary to deactivate the lateral guidance to be lower in the case of the determination of the presence of the at least one indication for the steering intervention which is intended by the driver (in the case of boundary conditions which are otherwise identical) than without the presence of the at least one indication for an intended steering intervention.

The reduction in the steering torque which is necessary for the deactivation of the lateral guidance in the case of an intended steering intervention permits easy overriding of the automated lateral guidance, in order to stop the automated lateral guidance, with the result that the comfort is increased for the driver. Moreover, the driver can frequently also deactivate the lateral guidance more rapidly if the driver has to apply a smaller steering torque for deactivation purposes.

In order to determine at least one indication for an intended steering intervention, the manner of the steering wheel contact on the part of the driver is preferably evaluated.

To this end, the driving system preferably comprises a hands-on detection device which can determine a driver-side steering wheel contact.

Here, the hands-on detection device can distinguish between a first steering wheel contact mode and a second steering wheel contact mode. The first steering wheel contact mode corresponds to the presence of the at least one indication for a current or imminent steering intervention which is intended by the driver, whereas the second steering wheel contact mode corresponds to the presence of at least one indication for an inadvertent current or imminent steering intervention.

The first steering wheel contact mode preferably corresponds to a contact of the steering wheel by way of two hands. In the case of the first steering wheel contact mode, for example, the contact to the steering wheel takes place on two sides of the steering wheel rim, and a two-sided contact of this type can be determined, for example, by the hands-on detection device.

In the case of a second steering wheel contact mode, a contact of the steering wheel takes place only in a single region, for example, only on a single side of the steering wheel rim.

It can be determined via a sensor system on the steering wheel, in particular in the steering wheel rim, whether there has been one contact (possibly inadvertently, for example, a hand lying on said steering wheel) or two contacts (probably intentionally, for example, two hands lying on said steering wheel).

A contact on the front and rear side of the steering wheel rim namely takes place in the case of the steering wheel being gripped around by way of at least one hand; this indicates an intended steering intervention. Placing of a hand onto the steering wheel or a contact of the steering wheel by way of the leg, without the driver intending a steering intervention, namely brings about no contact on the front and rear side of the steering wheel rim.

An example hands-on detection device comprises a sensor system for the detection of the hands bearing against the steering wheel. The hands-on sensor system can be, for example, a capacitive, resistive, piezoelectric sensor system or any other desired type of sensor system which is integrated, for example, into the steering wheel rim. The hands-on detection device comprises an evaluation unit which is coupled to the sensor system for the indication of an existing hand contact state from a plurality of hand contact states which can be distinguished by the device with regard to the hands bearing against the steering wheel. The plurality of distinguishable hand contact states comprise, for example, at least the following distinguishable states:

bearing of merely a single hand against the steering wheel;
bearing of both hands against the steering wheel;
no bearing of the hands against the steering wheel (e.g., no hand of the driver bears against the steering wheel).

The hands-on detection device is therefore capable of distinguishing between a hand lying on said steering wheel and two hands lying on said steering wheel. It can even be provided that, for the state where merely a single hand bears against the steering wheel, it can be indicated whether the left or the right hand bears against the steering wheel.

For example, there are a first part sensor for the detection of the left hand bearing against the steering wheel, and a second part sensor which is separate from the first part sensor for the detection of the right hand bearing against the steering wheel. Here, the first part sensor is preferably integrated into the left-hand half of the steering wheel rim, whereas the second part sensor is integrated into the right-hand half of the steering wheel rim.

The part sensors are preferably of the same sensor type, for example, capacitive or resistive. In the evaluation unit, for example, a first measured signal which relates to the first part sensor and a second measured signal which relates to the second part sensor are evaluated individually, and a decision is made on the basis of the two measured signals as to whether merely a single hand bears against the steering wheel or both hands bear against the steering wheel.

In the case of capacitive part sensors, for example, two separate sensor mats which are not connected electrically are integrated into the steering wheel rim in the left-hand and right-hand steering wheel half, wherein a signal which is characteristic of the capacitance of the first sensor mat and a signal which is characteristic of the capacitance of the second sensor mat are evaluated in the evaluation unit for the detection of the hand contact state.

Each part sensor can comprise further subsensors which are arranged at different locations of the steering wheel rim, with the result that, for example, the position of the respective hand on the steering wheel rim can be determined.

In the case of one alternative embodiment, a first sensor, for example a capacitive sensor, which is integrated into the steering wheel and a camera are used. For example, this is a camera (for example, arranged in the region of the instrument cluster) which is arranged in the driver's cockpit behind the steering wheel from the view of the driver and is directed toward the driver.

It is determined on the basis of a signal of the first sensor whether at least one hand bears against the steering wheel. This can take place in a conventional way. A decision is made on the basis of a video signal of the camera whether, in the case of the detection of at least one hand bearing against the steering wheel by means of the first sensor, a single hand bears or two hands bear against the steering wheel.

As an alternative or in addition, it might also be evaluated as an indication for an intended steering wheel intervention (if a corresponding sensor system is provided for this purpose) whether the contact of the steering wheel takes place on the front and rear side of the steering wheel rim.

The driving system is preferably set up to determine that a steering torque which is applied by the driver is greater than, or greater than or equal to, a defined threshold torque (that is to say, a threshold value for the steering torque), and to deactivate the lateral guidance in a manner which is dependent thereon, in particular in reaction thereto.

In order to reduce the steering torque which is necessary for the deactivation of the automated lateral guidance in the case of a steering intervention which is intended by the driver, the driving system configures the magnitude of the threshold torque to be reduced in the case of the determination of the presence of the at least one indication for the steering intervention which is intended by the driver (in comparison to said value without the presence of the at least one indication for an intended steering intervention), in particular is reduced in reaction to the determination of the presence of the at least one indication for the steering intervention which is intended by the driver.

The deactivation of the automated lateral guidance might also be triggered by way of monitoring of another variable which is linked to the magnitude of the steering intervention.

For example, a deviation variable can be determined which is characteristic of a deviation which is brought about by the driver by way of the steering intervention with respect to vehicle driving without steering intervention.

For example, a trajectory comparison takes place between the driving trajectory which is triggered by the driver and the driving trajectory which is planned by the driving system, the lateral offset of the driving trajectory which is triggered by the driver with respect to the driving trajectory which is planned by the driving system being determined as the deviation variable. As an alternative, a differential steering angle between the steering angle which is specified by the driver and the steering angle which is planned by the automated lateral guidance might also be used as a deviation variable.

If it is determined that the magnitude of the deviation variable is greater than or equal to a first deviation threshold, the automated lateral guidance is deactivated in reaction thereto.

The driving system configures the magnitude of the first deviation threshold to be reduced in the case of the determination of the presence of the at least one indication for the steering intervention which is intended by the driver (in comparison with said threshold without the presence of the at least one indication for an intended steering intervention), in particular is reduced in reaction to the determination of the presence of the at least one indication for the steering intervention which is intended by the driver.

Instead of the steering torque which is applied by the driver or the above-described deviation variable, any other desired variable which is linked to the driver-side steering intervention might also be used, which variable is compared with a threshold value, and the automated lateral guidance is deactivated in a manner which is dependent on the result of the comparison. The threshold value is then dependent on whether this is an intended steering intervention or not.

A second aspect of the application relates to the activation of the automated lateral guidance starting from a driving state with deactivated lateral guidance. The technical teaching described in the following text for the activation of the automated lateral guidance in accordance with the second aspect of the application can additionally be provided in the driving system in accordance with the first aspect of the application. It is also conceivable, however, that the technical teaching which is described in the following text in relation to the activation of the automated lateral guidance in accordance with the second aspect of the application is realized in any desired driving system with at least automated lateral guidance independently of the first aspect of the application. In accordance with the second aspect of the present subject matter, virtual vehicle driving for automated lateral guidance is determined, for example, a planned target driving trajectory for the automated lateral guidance and possibly longitudinal guidance. The vehicle driving is therefore virtual, since the vehicle is first of all still in the state with manual lateral guidance and said determined virtual vehicle driving is not used for the lateral guidance.

A deviation variable is determined which is characteristic of a deviation of the manual vehicle driving with respect to virtual vehicle driving in the case of automated lateral guidance, for example, the lateral offset of the driving trajectory which is currently being driven by the driver with respect to the driving trajectory which is planned by the driving system.

If it is determined that the magnitude of the deviation variable is less than, or less than or equal to, a second deviation threshold, the automated lateral guidance is activated (again).

As a result, the lateral guidance can be activated automatically in a way which is very comfortable for the driver, without it being necessary for the driver to carry out a dedicated operating action for the activation to this end, for example, without it being necessary for said driver to actuate an operating button for the activation.

The automated lateral guidance is preferably not activated immediately when the magnitude of the deviation is less than, or less than or equal to, the second deviation threshold. Instead, the automated lateral guidance is preferably not activated (again) until it has been determined that the magnitude of the deviation is less than, or less than or equal to, the second deviation threshold for a given minimum time period.

A third aspect of the application also relates to the activation of the automated lateral guidance starting from a driving state with deactivated lateral guidance. The technical teaching described in the following text for the activation of the automated lateral guidance can additionally be provided in the driving system in accordance with the first and/or second aspect of the application. It is also conceivable, however, that the technical teaching described in the following text in relation to the activation of the automated lateral guidance in accordance with the third aspect of the application is realized in any desired driving system with at least automated lateral guidance independently of the first and second aspect of the application.

In accordance with the third aspect of the application, it is determined in a driving state with deactivated automated lateral guidance that there is no longer any driver-side steering wheel contact. This can be determined by means of a hands-on sensor system. The automated lateral guidance is activated in a manner which is dependent thereon. Virtual vehicle driving in the case of automated lateral guidance is preferably determined in the driving state with deactivated automated lateral guidance, as has already been described in the above text. Furthermore, a deviation variable is determined which is characteristic of a deviation of the manual vehicle driving with respect to the virtual vehicle driving in the case of automated lateral guidance, as has already been described in the above text. In the case of the determination that there is no longer any driver-side steering wheel contact, the automated lateral guidance is activated (again) if the magnitude of the deviation is less than, or less than or equal to, a third deviation threshold.

A fourth aspect relates to a method for deactivating automated lateral guidance of a driving system for automated driving for a motor vehicle with a steering wheel, with the following steps:

determining of the presence of at least one indication that a current or imminent manual steering intervention does not take place inadvertently, but rather is intended by the driver;

starting from a driving state with activated lateral guidance, deactivating of the automated lateral guidance in reaction to a manual steering intervention, wherein, in order to deactivate the lateral guidance within the context of the manual steering intervention, a required steering torque which operates counter to the activated lateral guidance is to be applied by the driver, and the magnitude of the steering torque which is necessary to deactivate the lateral guidance is lower in the case of the determination of the presence of the at least one indication for the steering intervention which is intended by the driver than without the presence of the at least one indication for an intended steering intervention.

The above comments in respect of the driving system according to the present subject matter in accordance with the first aspect of the application also apply in a corresponding way to the method according to the present subject matter in accordance with the fourth aspect of the application.

The method according to the present subject matter in accordance with the fourth aspect of the application can optionally additionally also relate to the activation of the automated lateral guidance and, to this end, can be augmented by features of the second and/or third aspect of the application.

BRIEF DESCRIPTION OF THE DRAWINGS

FIG. 3a shows an example profile of a driver-side steering intervention plotted against the distance s, FIG. 3b shows an example relationship between the threshold value $M_{L,S}$ for the steering torque $M_L$ and an associated tolerance range.

DETAILED DESCRIPTION OF THE DRAWINGS

FIG. 1 shows the quantitative profile of the steering torque $M_L$ to be applied by the driver in the case of an increase of the driver-side steering intervention for a conventional driver system. The magnitude of the steering torque $M_L$ which is to be applied by the driver is shown on the Y-axis of the diagram, whereas the X-axis of the diagram is characteristic of the magnitude of the steering intervention and, for example, describes the deviation in the transverse direction from the trajectory which is planned by the driving system.

The curve $T_{AF}$ (shown as a straight line here for reasons of simplification) describes a trajectory which is planned by the vehicle for automated driving, on which trajectory the automated lateral guidance and, if present, also the automated longitudinal guidance are based.

Figure 1A:
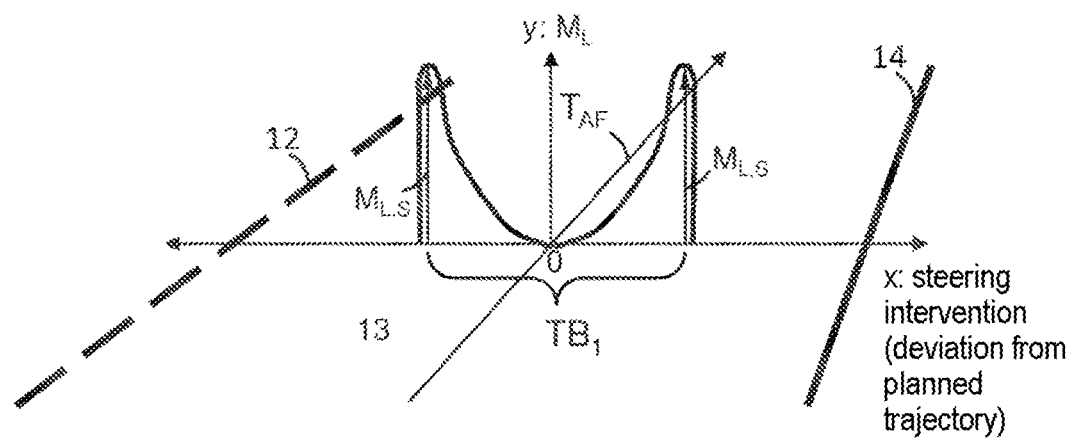
FIG. 1a shows an example profile of the steering torque to be applied by the driver in the case of an increase of the driver-side steering intervention in the case of a conventional driver system.

For improved comprehension, FIG. 1a shows a central reservation 12 (or a driving lane marking) of the roadway 13 which is being driven on, and a right-hand roadway verge 14.

As shown in FIG. 1a, as the magnitude of the steering intervention increases to the left and the right of the planned trajectory $T_{AF}$, the magnitude of the steering torque $M_L$ which is to be applied by the driver increases. Said steering torque $M_L$ of the driver operates counter to the automated lateral guidance which attempts by means of a steering counter torque to correct the deviation from the planned trajectory $T_{AF}$, which deviation results from the steering intervention.

The automated lateral guidance is shut down, or deactivated, if the magnitude of the steering torque which is applied by the driver (and is determined on the system side) exceeds the threshold value $M_{L,S}$ (in the case of one alternative refinement: if the magnitude of the steering torque which is applied by the driver reaches the threshold value $M_{L,S}$). As can be seen from FIG. 1a, the magnitude of the value of the threshold torque $M_{L,S}$ is relatively high. The steep curve of the steering torque $M_L$ and the high threshold torque value $M_{L,S}$ prevent inadvertent overriding, and keep the vehicle on the planned trajectory $T_{AF}$ for automated driving. It is laborious for the driver, however, to exceed the high magnitude of the threshold torque $M_{L,S}$ to deactivate the lateral guidance.

That region $TB_1$ on the X-axis which is shown in FIG. 1a, in which no deactivation of the lateral guidance takes place, and which corresponds to the X-axis region between the two Y-values $M_{L,S}$ is called a tolerance range in the following text. If the tolerance range (here: tolerance range $TB_1$) is departed from, the automated lateral guidance is shut down.

Figure 2:
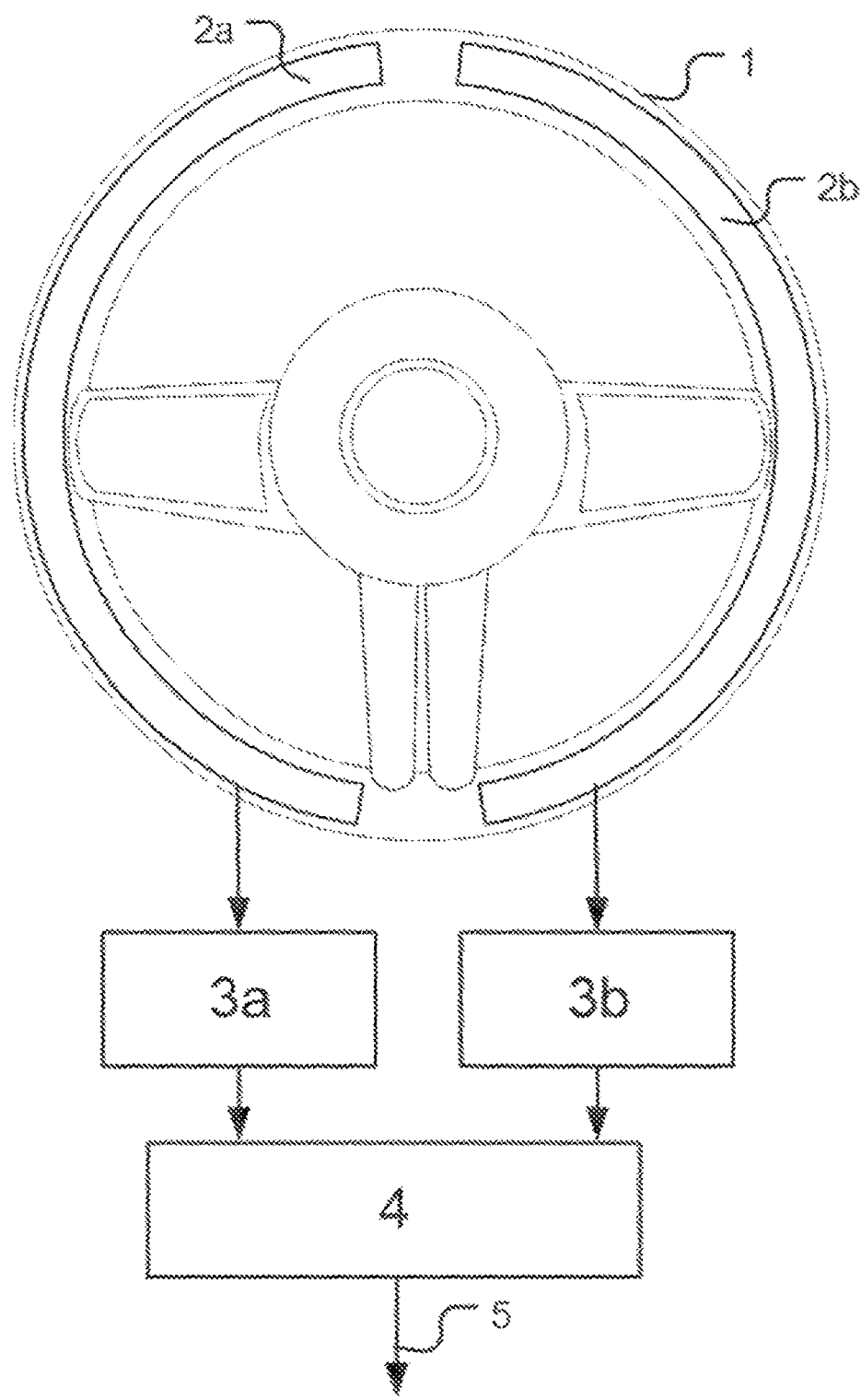
FIG. 2 shows an example hands-on detection device.

The example embodiment of the driving system according to the present subject matter can distinguish between a contact of the steering wheel by way of two hands and merely one hand. A contact by way of two hands is evaluated (in contrast to a contact by way of only a single hand) as an indication of the fact that the steering intervention which is already taking place or is directly imminent is intended by the driver. To this end, the driving system comprises, for example, the hands-on detection apparatus (shown diagrammatically in FIG. 2) for a steering wheel 1. Here, at least the sensor system is integrated into the steering wheel rim; the evaluation can take place inside or outside the steering wheel 1.

The hands-on detection device comprises a first part sensor 2a which is integrated into the left-hand half of the steering wheel rim, and a second part sensor 2b which is integrated into the right-hand half of the steering wheel rim. The part sensors 2a and 2b are, for example, two capacitive sensor mats.

The first part sensor 2a is connected electrically to a first part evaluation unit 3a which is set up to determine whether the driver makes contact by way of the left hand with the steering wheel in the sensor region of the part sensor 2a, for example, by way of measurement of a characteristic variable for the capacitance which is subjected to a change in the case of contact of the steering wheel region which is monitored by the respective part sensor. The second part sensor 2b is connected electrically to a second part evaluation unit 3b which is set up to determine whether the driver makes contact by way of the right hand with the steering wheel 1 in the sensor region of the part sensor 2b, for example, by way of measurement of a characteristic variable for the capacitance.

On the basis of the preferably digital evaluation signals of the two part evaluation units 3a, 3b which in each case indicate whether a contact by way of the left or right hand has been determined by means of the respective part sensor 2a, 2b, a determination can be carried out in the evaluation unit 4 as to whether

- merely a single hand bears against the steering wheel 1 (hand contact state 1H),
- both hands bear against the steering wheel 1, that is to say a contact takes place on both sides of the steering wheel rim (hand contact state 2H), or
- no hand bears against the steering wheel 1 (hand contact state OH).

The digital output signal 5 of the evaluation unit 4 indicates which of the hand contact states 2H, 1H, OH is present, and is evaluated by the driving system.

If a contact of the steering wheel by way of two hands (state 2H) is detected, the threshold value $M_{L,S}$ is reduced as a reaction thereto with respect to the value which is shown in FIG. 1a. If merely a contact by way of a single hand (state 1H) is detected, the threshold value $M_{L,S}$ corresponds to the high value which is shown in FIG. 1a.

Figure 1B:
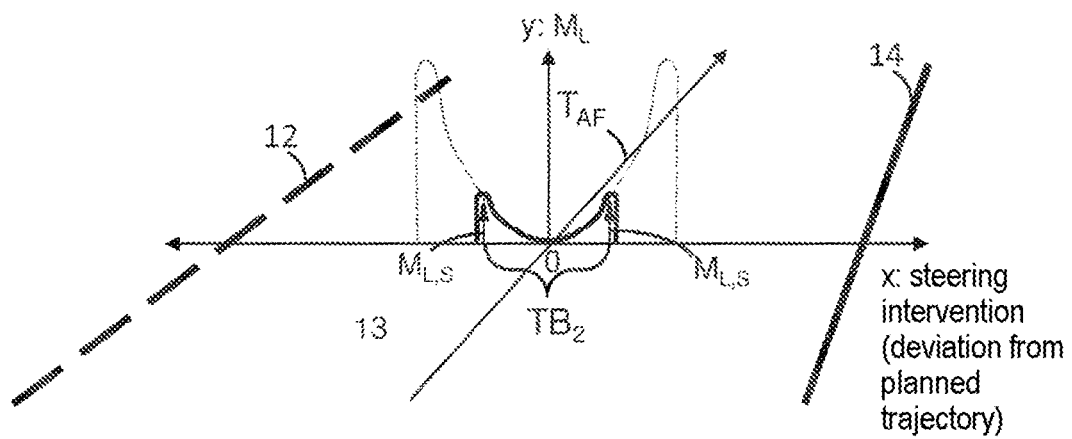
FIG. 1b shows an example profile of the steering torque to be applied by the driver in the case of an increase of the driver-side steering intervention in the case of a first example embodiment of a driving system according to the present subject matter in the case of the determination of an intended steering intervention.

The reduced threshold value $M_{L,S}$ is shown in FIG. 1b. Apart from the reduction of the threshold value $M_{L,S}$, the profile of the steering torque $M_L$ plotted against the steering intervention in FIG. 1b remains unchanged in the X-direction, that is to say the stiffness/overriding capability of the steering system in the case of an increasing steering intervention behaves as in FIG. 1a, but the lateral guidance is already deactivated in the case of a relatively low magnitude of the value $M_{L,S}$ for the steering torque $M_L$. The parameters of the regulating structure of the automated lateral guidance which influence the stiffness/overriding capability of the steering system preferably remain unchanged (without consideration of the threshold value $M_{L,S}$).

If the driver therefore grips the steering wheel 1 by way of both hands (initially without the intention to override) and the counter torque to be overcome is lowered, the steering sensation with regard to the stiffness/overriding capability of the steering system is maintained. In comparison with FIG. 1a, however, the driver must apply a low steering torque (i.e., operate counter to a low counter torque), to deactivate the automated lateral guidance.

As can be seen from FIG. 1b, the tolerance range $TB_2$ which describes the range of the steering intervention which is still tolerated without shutting down of the lateral guidance is decreased in comparison with the tolerance range $TB_1$ from FIG. 1a.

Figure 1C:
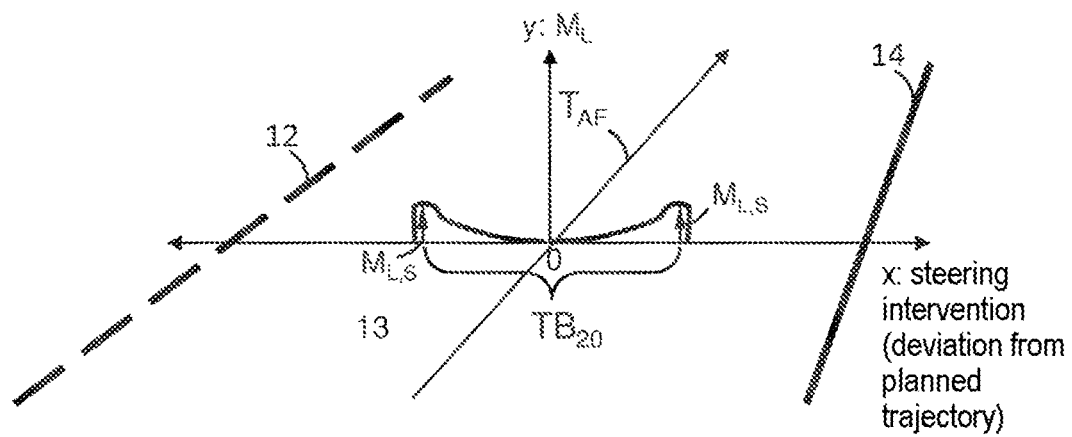
FIG. 1c shows an example profile of the steering torque to be applied by the driver in the case of an increase of the driver-side steering intervention in the case of a second example embodiment of a driving system according to the present subject matter in the case of the determination of an intended steering intervention.

FIG. 1c shows an alternative refinement with respect to FIG. 1b for the reduction of the threshold value $M_{L,S}$ in the case of contact of the steering wheel by way of two hands (state 2H). Here, the threshold value $M_{L,S}$ is both reduced with respect to FIG. 1a, but additionally the magnitude of the gradient of the steering torque curve is also reduced, that is to say the stiffness/overriding capability of the steering system is reduced in comparison with FIG. 1a. To this end, one or more parameters of the regulating structure of the automated lateral guidance which influence the stiffness/overriding capability of the steering system are preferably changed. Concepts for setting the stiffness/overriding capability in the case of a lateral guidance regulating structure are described, for example, in document DE 10 2014 208 785 A1. In contrast to FIG. 1b, the necessary steering intervention (for example, the necessary lateral deviation from the planned driving trajectory $T_{AF}$) for shutting down the lateral guidance by way of the reduction of the magnitude of the gradient is considerably greater, but the steering torque $M_L$ which is necessary for shutting down the automated lateral guidance is somewhat lower. By way of adaptation of the stiffness of the steering system, in the case of a reduction of the value $M_{L,S}$ (in reaction to the determination of a two-handed steering wheel contact), a tolerance range $TB_{20}$ can be obtained which corresponds substantially to the tolerance range $TB_1$ without a reduction of the value $M_{L,S}$ (in the case of a single-handed steering wheel contact) in FIG. 1a.

Since the flanks of the steering torque $M_L$ rise less steeply in FIG. 1c than the profile in FIG. 1a and FIG. 1b, it is conceivable that the vehicle is no longer kept so precisely in its lane. Moreover, it is disadvantageous in the case of the profile in FIG. 1c with respect to FIG. 1b that the counter torque drops suddenly in the case of an initial single-handed steering intervention and a subsequent change from a single-handed steering wheel contact to a two-handed steering wheel contact.

FIGS. 3a and 3b show the change of the threshold value $M_{L,S}$ and the change of the tolerance range along a driving trajectory $T_{AF}$ which is planned by the vehicle for automated driving with consideration of the hand contact state which is determined by the hands-on detection device.

In FIG. 3a, the Y-axis describes a driver-side steering intervention plotted against the distance s of the driving trajectory $T_{AF}$, here as a deviation $\Delta$ (s) between the driving trajectory $T_M(s)$ which is triggered by the driver and the driving trajectory $T_{AF}$ (s) of automated driving. In FIG. 3b, the X-axis corresponds to the driver-side steering intervention (here, as a deviation $\Delta$ with respect to the driving trajectory), whereas the Y-axis shows the profile of the steering torque $M_L$.

Starting from a driving state with automated lateral guidance and preferably also automated longitudinal guidance (for example, in the case of highly automated driving on a highway), an inadvertent steering impulse with only one contact on the steering wheel (state 1H) takes place on the driver side from the distance point $s_1$ of the driving trajectory $T_{AF}$. The threshold value $M_{L,S}$ is not reduced and corresponds to the Y-values which are shown in FIG. 3b, are marked by way of arrows, and limit the tolerance range $TB_1$.

The deviation $\Delta$ (s), brought about by way of the steering impulse, of the driving trajectory $T_M(s)$ which is triggered by the driver with respect to the driving trajectory $T_{AF}(s)$ of automated driving remains within the tolerance range $TB_1$. This means that the magnitude of the high threshold value $M_{L,S}$ which is assigned to the tolerance range $TB_1$ is not exceeded, with the result that the lateral guidance is not deactivated. If the tolerance range $TB_1$ were left, the magnitude of the threshold value $M_{L,S}$ which is assigned to the tolerance range $TB_1$ would also be exceeded, with the result that the automated lateral guidance would be shut down.

A two-handed contact of the steering wheel is determined (state 2H) at the distance point $s_2$. In reaction thereto, the threshold value $M_{L,S}$ for overriding is reduced to the value which limits the tolerance range $TB_2$ in FIG. 3b. Since the threshold value $M_{L,S}$ is lower, the tolerance range $TB_2$ which is used is also smaller after the distance point $s_2$ than the tolerance range $TB_1$. Instead of the detection of a two-handed steering contact, it would also be conceivable to reduce the threshold $M_{L,S}$ and the tolerance range if reaching around the steering wheel (contact on the front and rear side of the steering wheel rim) is determined via a corresponding steering wheel sensor system (not shown in FIG. 2).

The contact of the steering wheel by way of both hands does not yet bring about shutting down of the automated lateral guidance. An intentional steering intervention of the driver takes place from the distance point $s_3$. At the distance point $s_4$, the steering intervention is so great that the deviation $\Delta$ (s) with respect to the driving trajectory $T_{AF}$ of automated driving leaves the tolerance range $TB_2$, and therefore the magnitude of the steering torque $M_L$ which is applied by the driver exceeds the then valid threshold value $M_{L,S}$. In reaction to the magnitude of the threshold value $M_{L,S}$ being exceeded, the automated lateral guidance is shut down.

Instead of monitoring the steering torque $M_L$ and deactivating the lateral guidance as a reaction to the threshold value $M_{L,S}$ being exceeded, it would also be conceivable to determine and to monitor the steering intervention in the form of the deviation $\Delta$ (s) with respect to the driving trajectory $T_{AF}$, and to shut down the lateral guidance in reaction to the tolerance range $TB_2$ being left.

For subsequent restarting of the lateral guidance, the steering intervention in the form of the deviation $\Delta$ (s) with respect to the (virtual) driving trajectory $T_{AF}$ is subsequently monitored and compared with the limits of the tolerance range. When the lateral guidance is deactivated, the tolerance range is increased to the broader tolerance range $TB_3$. The tolerance range $TB_3$ serves to restart the lateral guidance in the case of hands which bear against the steering wheel (a single hand or both hands). The lateral guidance is activated again if the deviation $\Delta$ (s) with respect to the (virtual) driving trajectory $T_{AF}$ lies in the tolerance range $TB_3$ for a minimum time period $T_{min,2}$. This does not take place in the example of FIG. 3a. It is determined at the distance point $s_5$ that a hand no longer lies on the steering wheel (state HO). If this is the case, the tolerance range $TB_4$ is increased considerably to activate the lateral guidance in comparison with the situation with one or two hands bearing against said steering wheel. If the deviation $\Delta$ (s) with respect to the driving trajectory $T_{AF}$ lies in the tolerance range $TB_4$ (preferably for a defined minimum time period $T_{min,1}$), the lateral guidance is activated and the vehicle is swung onto the planned trajectory $T_{AF}$ of automated driving. The minimum time period $T_{min,1}$ does not have to be constant, but rather can be dependent, for example, on the driving angle with respect to the planned vehicle trajectory $T_{AF}$ of automated driving; as the magnitude of the driving angle with respect to the planned trajectory $T_{AF}$ increases, the minimum time period $T_{min,1}$ preferably decreases. If the vehicle is, for example, on a collision course with a crash barrier and the driving angle with respect to the planned trajectory is great, the minimum time period $T_{min,1}$ should be rather low. If the vehicle is driving rather parallel to the calculated trajectory $T_{AF}$ and therefore the driving angle with respect to the planned trajectory $T_{AF}$ is low, the minimum time period $T_{min,1}$ can be greater in comparison, and the hands not bearing against the steering wheel can be tolerated for a somewhat longer time.

Figure 3C:
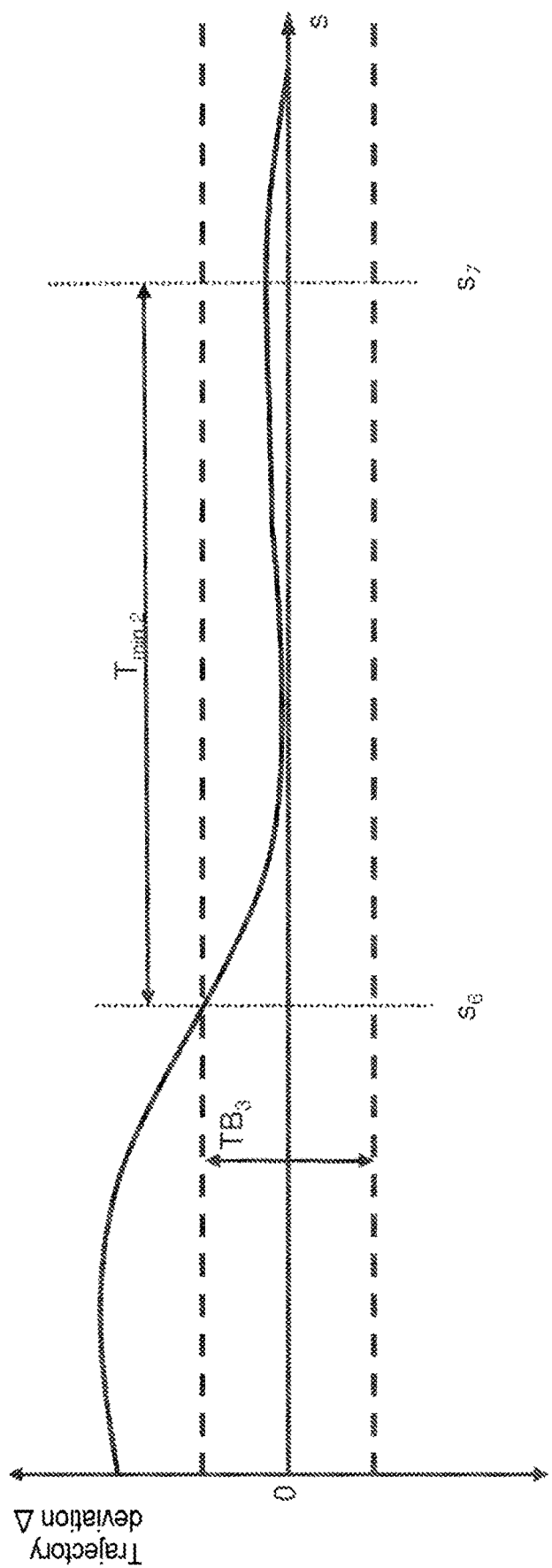
FIG. 3c shows an example course of a driver-side steering intervention plotted against the distance s in the case of the activation of the automated lateral guidance.

FIG. 3c shows the restarting of the lateral guidance in the case of steering wheel contact (state 1H or 2H). As soon as the deviation $\Delta$ (s) with respect to the driving trajectory $T_{AF}$ at the distance point $s_6$ falls within the tolerance range $TB_3$ again, a check is made as to whether the deviation $\Delta$ (s) with respect to the driving trajectory $T_{AF}$ remains in the tolerance range $TB_3$ for a minimum time period $T_{min,2}$. When the minimum time period $T_{min,2}$ is reached, the automated lateral guidance is activated again from the distance point $s_7$. The minimum time period $T_{min,2}$ also does not necessarily have to be constant here, but rather can be dependent on the driving angle with respect to the planned vehicle trajectory $T_{AF}$ of automated driving, as has been described in the above text in relation to the minimum time period $T_{min,1}$.

The tolerance ranges $TB_3$ and $TB_4$ for restarting the automated lateral guidance can be defined in a manner which is dependent on the driving situation. After a lane change on a multiple-lane road, it can be appropriate, for example, for a greater tolerance range for restarting of the lateral guidance to be defined, since it can be assumed that the motivation for the driver-side overriding of the automated lateral guidance was not poor lane discipline of the automated lateral guidance, but rather was the lane change which was intended by the driver.

What is claimed is:

1. A driving system for automated driving with at least automated lateral guidance for a motor vehicle with a steering wheel comprising:
  an electronic control unit configured to:
    deactivate the automated lateral guidance as a reaction to a manual steering intervention starting from a driving state with activated automated lateral guidance; and
    during a driving state with deactivated automated lateral guidance:
      determine a virtual vehicle guiding by automated lateral guidance,
      determine a deviation variable which is characteristic of a deviation of manual vehicle driving with respect to the virtual vehicle guiding determined by the automated lateral guidance,
      determine the deviation variable is less than or equal to a second deviation threshold value, and
      activate the automated lateral guidance again based on the determination.

2. The driving system according to claim 1, wherein the electronic control unit is further configured to:
  determine a driver-side steering wheel contact based on an output of a steering wheel sensor, and
  distinguish between a first steering wheel contact mode and a second steering wheel contact mode, wherein
    the first steering wheel contact mode corresponds to the presence of an indication that a manual steering intervention is intended by the driver, and
    the second steering wheel contact mode corresponds to the presence of an indication that a manual steering intervention is inadvertent by the driver.

3. The driving system according to claim 2, wherein the electronic control unit is further configured to:
  determine a two-handed contact of the steering wheel as the first steering wheel contact mode, wherein
    the two-handed contact includes a contact on a left-hand and right-hand sides of a rim of the steering wheel.

4. The driving system according to claim 2, wherein the electronic control unit is further configured to:
  determine a contact of the steering wheel on the front and rear sides of a rim of the steering wheel as the first steering wheel contact mode.

5. The driving system according to claim 1, wherein the electronic control unit is further configured to:
  determine that a variable corresponding to a driver-side manual steering intervention is greater than or equal to a threshold value,
  based on the determination, deactivate the automated lateral guidance, and reduce the threshold value in response to determining the presence of an indication for the manual steering intervention intended by the driver.

6. The driving system according to claim 5, wherein the electronic control unit is further configured to:
   determine that a variable corresponding to a steering torque applied by the driver, which is linked to the driver-side manual steering intervention, is greater than or equal to a threshold torque,
   based on the determination, deactivate the automated lateral guidance, and
   reduce the threshold torque in response to determining the presence of the indication for the manual steering intervention intended by the driver.

7. The driving system according to claim 5, wherein the electronic control unit is further configured to:
   determine a deviation variable corresponding to the driver-side manual steering intervention, wherein
      the deviation variable is characteristic of a deviation configured based on the manual steering intervention by the driver with respect to vehicle driving without steering intervention,
   determine the deviation variable is greater than or equal to a first deviation threshold value,
   deactivate the automated lateral guidance based on the determination, and
   reduce the first deviation threshold value in response to determining the presence of the indication for the manual steering intervention intended by the driver.

8. The driving system according to claim 1, wherein the electronic control unit is further configured to:
   activate the automated lateral guidance again when it is determined that the deviation is less than or equal to the second deviation threshold value for a minimum time duration.

9. A driving system for automated driving with at least automated lateral guidance for a motor vehicle with a steering wheel comprising:
   an electronic control unit configured to:
      deactivate the automated lateral guidance as a reaction to a manual steering intervention starting from a driving state with activated automated lateral guidance; and
      in the driving state with deactivated automated lateral guidance:
         determine a virtual vehicle guiding by automated lateral guidance,
         determine a deviation variable which is characteristic of a deviation of manual vehicle driving with respect to the virtual vehicle guiding determined by the automated lateral guidance, and
         in case of the determination that there is no longer any driver-side steering wheel contact:
            activate the automated lateral guidance again if the deviation variable is less than or equal to a third deviation threshold value.

10. A method for deactivating automated lateral guidance of a driving system for automated driving for a motor vehicle with a steering wheel comprising:
   starting from a driving state with activated automated lateral guidance, deactivating the automated lateral guidance in response to manual steering intervention; and during a driving state with deactivated automated lateral guidance:
      determining a virtual vehicle guiding by automated lateral guidance,
      determining a deviation variable which is characteristic of a deviation of manual vehicle driving with respect to the virtual vehicle guiding determined by the automated lateral guidance,
      determining the deviation variable is less than or equal to a second deviation threshold value, and
      activating the automated lateral guidance again based on the determination.

11. A non-transitory computer-readable medium comprising instructions operable, when executed by one or more computing systems, to execute the method of claim 10.

12. The driving system according to claim 1, wherein the deviation variable is a deviation between a driving trajectory of the manual vehicle driving and a driving trajectory of the virtual vehicle guiding.

13. The driving system according to claim 1, further comprising:
   a first sensor of the steering wheel; and
   a second sensor of the steering wheel, wherein
      the first and second sensors are disposed at different positions of a rim of the steering wheel to differentiate between contact of a first and second hand of a driver.

14. The driving system according to claim 9, wherein the electronic control unit is further configured to:
   determine a driver-side steering wheel contact based on an output of a steering wheel sensor, and
   distinguish between a first steering wheel contact mode and a second steering wheel contact mode, wherein
      the first steering wheel contact mode corresponds to the presence of an indication that a manual steering intervention is intended by the driver, and
      the second steering wheel contact mode corresponds to the presence of an indication that a manual steering intervention is inadvertent by the driver.

15. The driving system according to claim 14, wherein the electronic control unit is further configured to:
   determine a two-handed contact of the steering wheel as the first steering wheel contact mode, wherein
      the two-handed contact includes a contact on a left-hand and right-hand sides of a rim of the steering wheel.

16. The driving system according to claim 14, wherein the electronic control unit is further configured to:
   determine a contact of the steering wheel on the front and rear sides of a rim of the steering wheel as the first steering wheel contact mode.

17. The driving system according to claim 9, wherein the electronic control unit is further configured to:
   determine that a variable corresponding to a driver-side manual steering intervention is greater than or equal to a threshold value,
   based on the determination, deactivate the automated lateral guidance, and
   reduce the threshold value in response to determining the presence of an indication for the manual steering intervention intended by the driver.

18. The driving system according to claim 17, wherein the electronic control unit is further configured to:
   determine that a variable corresponding to a steering torque applied by the driver, which is linked to the driver-side manual steering intervention, is greater than or equal to a threshold torque,
   based on the determination, deactivate the automated lateral guidance, and reduce the threshold torque in response to determining the presence of the indication for the manual steering intervention intended by the driver.

19. The driving system according to claim 9, wherein the electronic control unit is further configured to:
  activate the automated lateral guidance again when it is determined that the deviation is less than or equal to the third deviation threshold value for a minimum time duration.

20. The driving system according to claim 9, wherein the electronic control unit is further configured to:
  in a driving state with deactivated automated lateral guidance:
    determine that there is no longer any driver-side steering wheel contact, and
    activate the automated lateral guidance again in response.

* * * * *